US006490323B1

(12) United States Patent
Shen et al.

(10) Patent No.: US 6,490,323 B1
(45) Date of Patent: Dec. 3, 2002

(54) FAST COMPRESSED DOMAIN PROCESSING USING ORTHOGONALITY

(75) Inventors: Bo Shen, Mountain View, CA (US); Vasudev Bhaskaran, Palo Alto, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/335,464

(22) Filed: Jun. 17, 1999

(51) Int. Cl.⁷ .................................................. H04N 7/12
(52) U.S. Cl. ..................................................... 375/240.2
(58) Field of Search .......... 375/240.01, 240.12–240.16, 375/240.18, 240.2, 240.24; 382/232, 236, 238, 248, 250, 254; 708/400–402; H04N 7/12, 7/30

(56) References Cited

U.S. PATENT DOCUMENTS

| | | | | |
|---|---|---|---|---|
| 5,359,549 A | * | 10/1994 | Tanaka et al. | 708/401 |
| 5,408,274 A | | 4/1995 | Chang et al. | |
| 5,467,131 A | | 11/1995 | Bhaskaran et al. | 348/384 |
| 5,708,732 A | | 1/1998 | Merhav et al. | 382/232 |
| 5,793,985 A | | 8/1998 | Natarajan et al. | 395/200.77 |
| 5,832,135 A | | 11/1998 | Merhav et al. | 382/260 |
| 5,850,484 A | | 12/1998 | Beretta et al. | 382/250 |
| 5,883,979 A | | 3/1999 | Beratta et al. | 382/251 |
| 6,038,031 A | * | 3/2000 | Murphy | 382/254 |
| 6,125,212 A | * | 9/2000 | Kresch et al. | 382/250 |

OTHER PUBLICATIONS

Arai et al, "A Fast DCT–SQ Scheme for Images", Nov. 11, 1988, Trans. of IEICE, vol. E71, No. 11, pp. 1095–1097.*

Bo Shen, Ishwar K. Sethi and V. Bhaskaran, "Closed–Loop MPEG Video Rendering," Proc. IEEE Conf. Multimedia Computing and Systems, Ottawa, Canada, Jun., 1997.

Brian Smith and Larry Rowe, Algorithms for Manipulating Compressed Images, IEEE Computer Graphics and Applications, pp. 34–42, Sep., 1993.

A. C. Hung and T. H. Meng, "Statistical Inverse Discrete Cosine Transforms for Image Compression," Proc. SPIE Electronic Imaging, vol. 2187, pp. 196–205, 1994.

S. F. Chang and D. G. Messerschmitt, "Manipulation and Cokmpositing of M C–DCT Compressed Video," IEEE JSAC Special Issue on Intelligent Signal Processing, vol. 13, No. 1, pp. 1–11, Jan., 1995.

B. Shen and I. K. Sethi, "Convolution–Based Edge Detection for Image/Video in Block DCT Doain," Journal of Visual Communication and Image Representation, vol. 7, No. 4, pp. 411–423, Dec., 1996.

Bo Shen and Ishwar K. Sethi, "Inner–Block Operations on Compressed Images," Vision and Neural Networks Laboratory, Department of Computer Science, Wayne State University, pp. 489–498, 1995.

* cited by examiner

Primary Examiner—Richard Lee

(57) ABSTRACT

A method and apparatus for receiving and processing digitized video data in a discrete cosine transform (DCT) domain exploits the orthogonality of a convolution function along with the data sparseness present in the DCT domain. In a preferred method, the convolution function is applied to vectors associated with a plurality of input video data frames in consideration of an orthogonal characteristic of the convolution function. More specifically, cross-products of the input vectors which would yield non-zero output vectors are identified and weighting factors for the cross-products are determined in consideration of this orthogonality. An output video data frame is generated from the non-zero output vectors and the weighting factors. A convolution operation based upon the disclosed method and apparatus is suitable for chroma-keying as well as other video or audio blending applications.

21 Claims, 15 Drawing Sheets

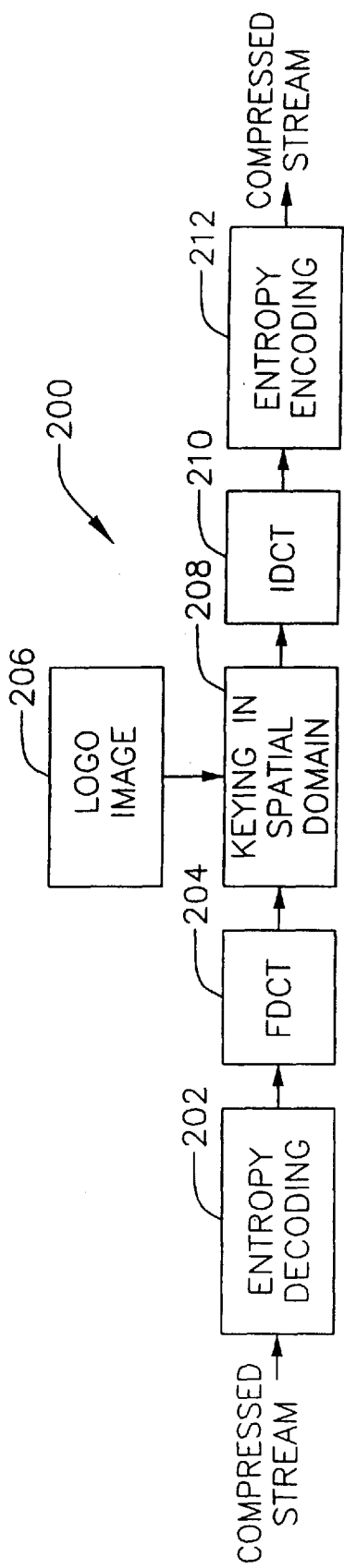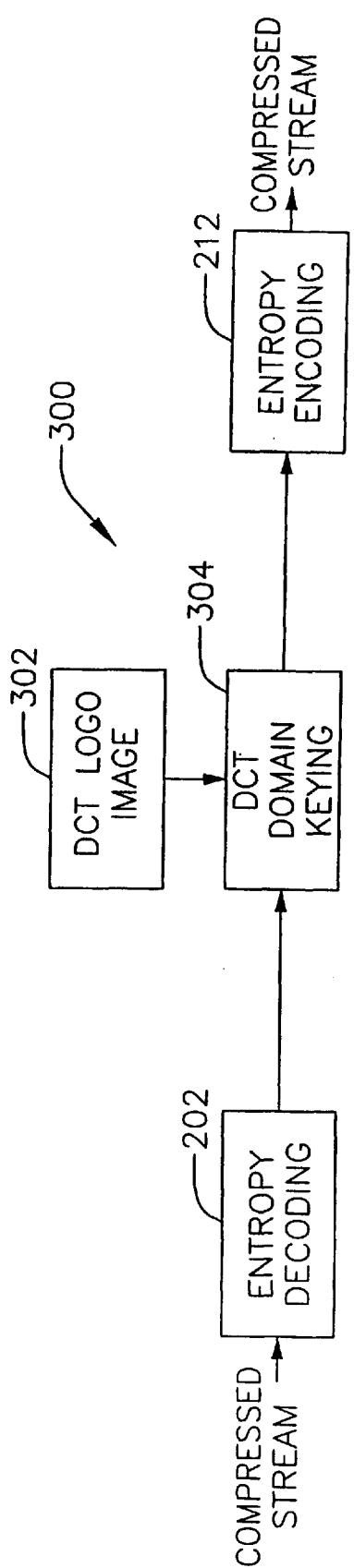

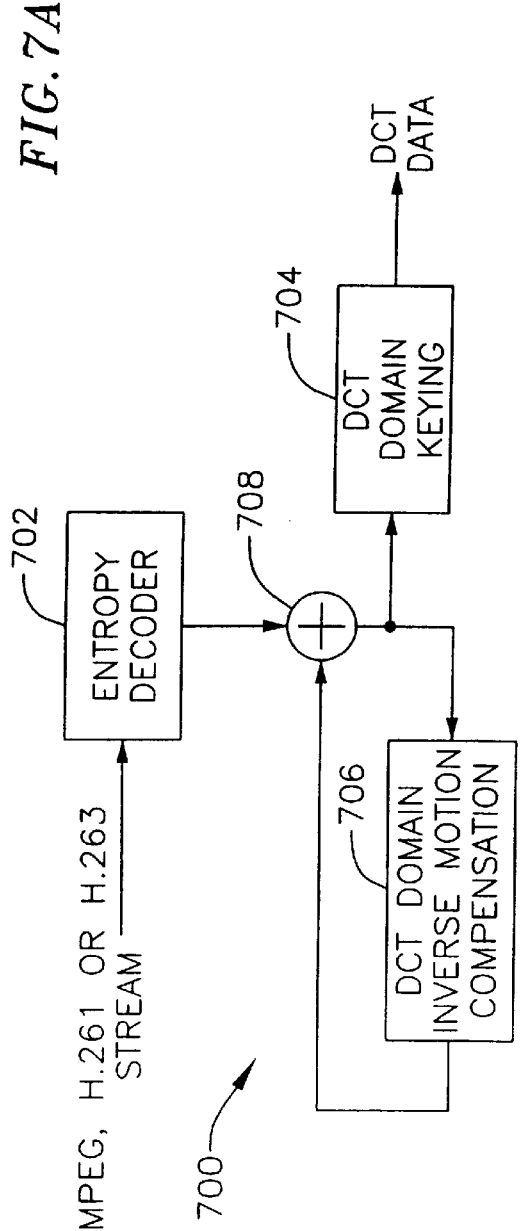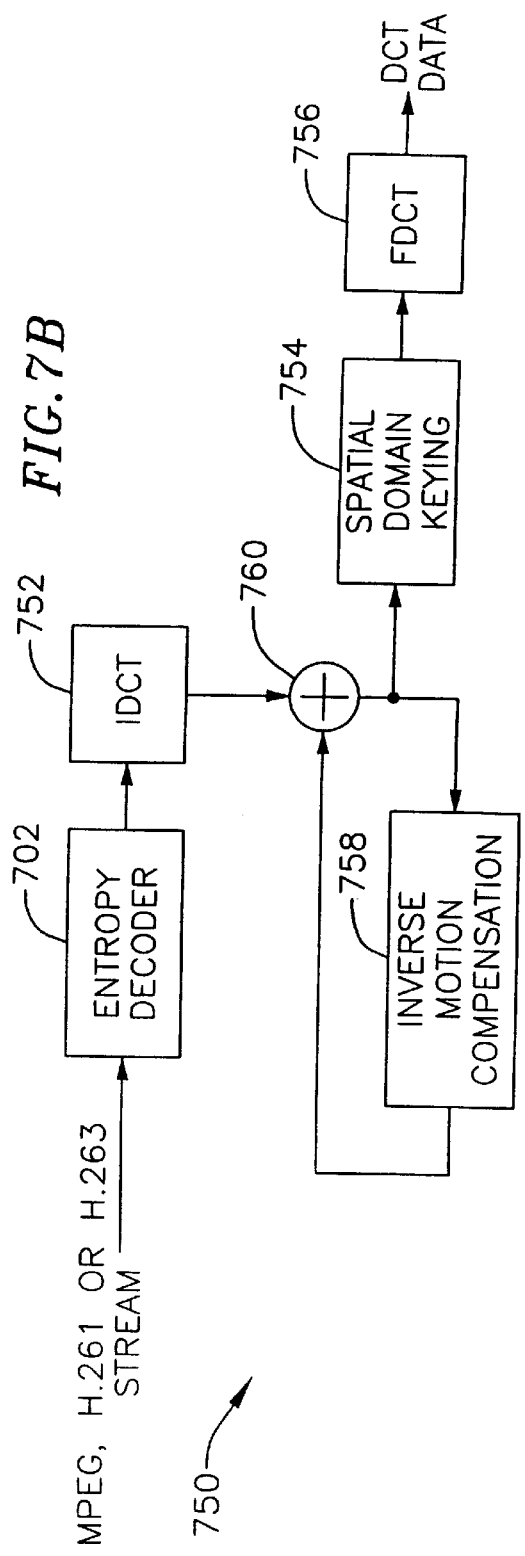

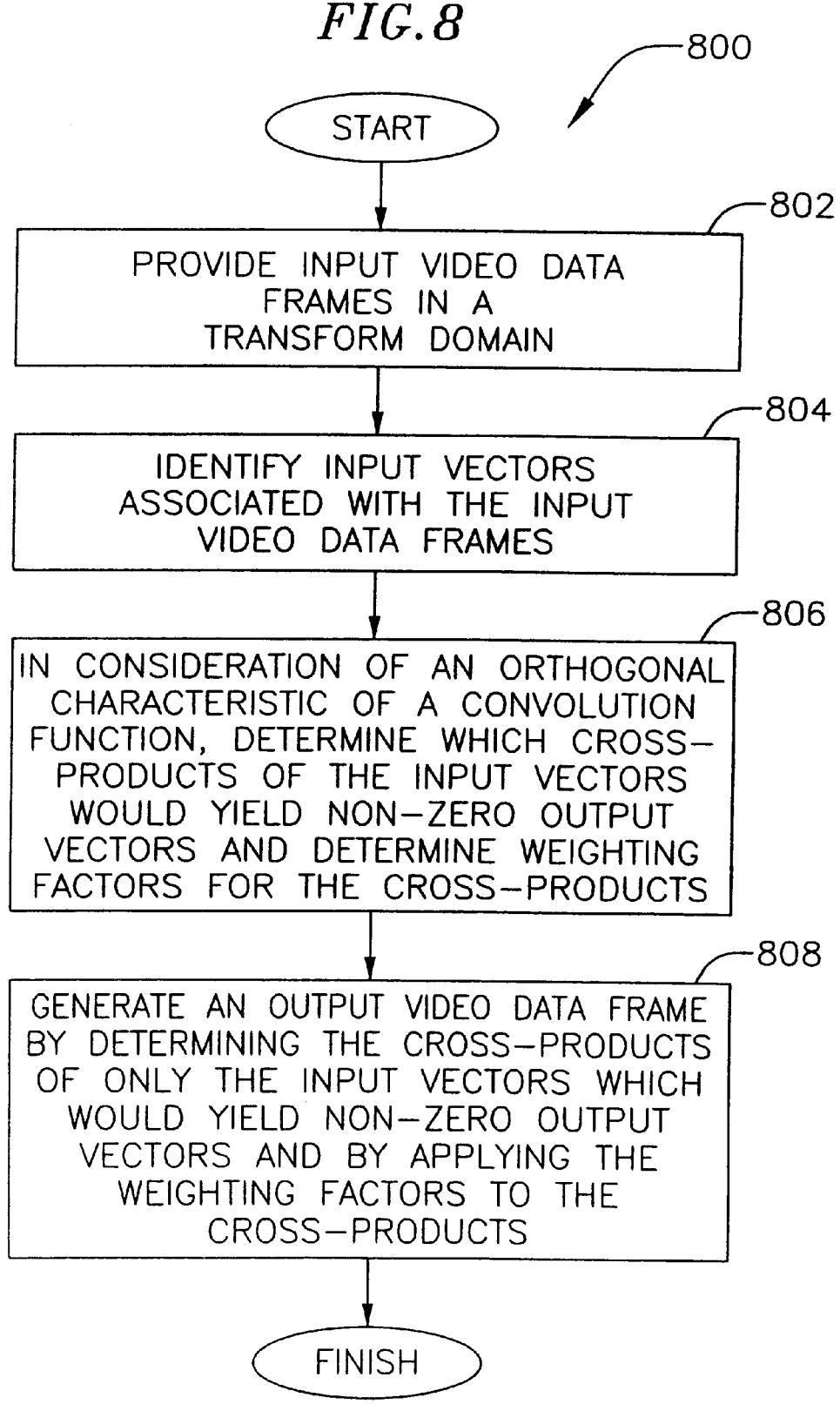

FAST COMPRESSED DOMAIN PROCESSING USING ORTHOGONALITY

BACKGROUND OF THE INVENTION

1. Field of the Invention

The present inventions relate to methods and apparatus for processing data in a compressed format, including the processing of a plurality of frames of input data while in a transform domain and, for example, a method and apparatus for processing input vectors associated with the input data frames to determine contributions of cross-products of the input vectors to an output vector associated with a frame of output data in consideration of an orthogonal characteristic of a convolution operation employed to generate the output data.

2. Description of the Related Art

As with many of today's technologies, the current trend in image sequence developing and editing is to use digital formats. Even with motion picture film, editing of image sequences (including image splicing, color processing, and special effects) can be much more precisely accomplished by first converting images to a digital format, and performing desired edits upon the digital format. If desired, images can then be converted back to the original format.

Unfortunately, digital formats usually use enormous amounts of memory and transmission bandwidth. A single image with a resolution of 200×300 pixels can occupy megabytes of memory. When it is considered that many applications (for example, motion picture film processing) use far greater resolution, and that image sequences can include hundreds or thousands of images, it becomes very apparent that many applications are called upon to handle gigabytes of information, creating a bandwidth problem, in terms of computational and transmission resources.

To solve the bandwidth problem, standards have been proposed for image compression. These standards generally rely upon spatial or temporal redundancies which exist in one or more images.

A single image, for example, may have spatial redundancies in the form of regions having the same color (intensity and hue); a single, all blue image could potentially be represented simply by its intensity and hue, and information indicating that the entire frame has the same characteristics.

Temporal redundancies typically exist in sequences of images, and compression usually exploits these redundancies as well. For example, adjacent images in a sequence can be very much alike; exploiting redundancies, a compressed image sequence may include data on how to reconstruct current image frames based upon previously decoded frames. This data can be expressed as a series of vectors and difference information. To obtain this information, pixels in the second frame are grouped into image squares of 8×8 or 16×16 pixels ("blocks" of pixels), and a search is made in a similar location in a prior frame for the closest match. The vectors and difference information direct a decoder to reconstruct each image block of the second frame by going back to the first frame, taking a close match of the data (identified by the vector) and making some adjustments (identified by the difference information), to completely reconstruct the second frame.

One group of standards currently popular for compression of image sequences has been defined by the Moving Pictures Experts' Group, and these standards are generally referred to as "MPEG." The MPEG standards generally call for compression of individual images into three different types of compressed image frames: compressed independent ("I") frames exploit only spatial redundancies, and contain all the information used to reconstruct a single frame; compressed prediction ("P") frames exploit temporal redundancies from a prior frame (either a P or I frame) and typically only use about ⅓ as much data as an I frame for complete frame reconstruction; and compressed bi-directional ("B") frames can use data from either or both of prior and future frames (P or I frames) to provide frame reconstruction, and may only use ¼ as much data as a P frame. Other compression standards also rely upon exploitation of temporal image redundancies, for example, H.261 and H.263.

Chroma-keying or blue screen matting is used widely in digital video editing to create the illusion of motion or presence at some specific place. In such applications, an object is filmed against a blue background which, in the editing process, is replaced by a static or a moving shot at some specific place to create the desired illusion. Unlike simple overlapping, in which the background of the overlapping image/video is black (a zero in digital image representation) and can be done via masking, chroma-keying uses the transparency of the chromakey pixels thus making a pixel-wise operation necessary. The degree of transparency of each pixel is called the alpha channel or alpha image. Accordingly, chroma-keying is also referred to as "alpha blending". The alpha channel, which represents the transparency of each pixel, can be derived from the chromakey specified by the video editor, and then a pixel multiplication operation is performed to accomplish the chroma-keying effect.

In digital TV broadcasting, regular TV programs (live or pre-recorded) are typically stored and transmitted in a compressed form. MPEG-2 is a compressed form used in many digital TV consortia such as HDTV or ATSC. Conventional processing of compressed image or video data involves first decompressing the data, and then applying the desired processing function. The processed data is then recompressed for transmission or storage.

Compressed domain processing may yield several advantages vis-a-vis spatial domain processing such as (a) smaller data volume, (b) lower computation complexity since the processes of complete decompression and compression can be avoided, and (c) preservation of image fidelity since decompression-compression processes can often be eliminated. Thus, it would be helpful to replace the spatial domain processing scheme with an equivalent processing of the compressed domain representation.

A conventional way of performing chroma-keying on MPEG sequence is to decompress the sequence, apply the chroma-keying operation and recompress it back. Within this loop, costly DCT and motion estimation operations may make it effectively impossible for real time applications. Therefore, it would be helpful to have a chroma-keying technique applicable in the compressed domain to avoid the DCT and motion estimation bottlenecks.

For example, a logo keying operation is used frequently in the digital video broadcasting environment. Conventionally, the compressed stream is fully decompressed, and then compressed again after the logo-keying operation.

FIG. 2 is a functional block diagram of a conventional logo keying operation 200. After entropy decoding of the compressed stream at block 202, a forward discrete cosine transform (FDCT) is employed at block 204. Logo image data is represented by block 206. The output of the FDCT and the logo image data are both provided to block 208 which represents keying in the spatial domain. An inverse discrete cosine transform (IDCT) is applied at block 210 to the output of block 208. And finally, block 212 represents entropy encoding of the output of block 210 to provide the recompressed stream.

In the case of chroma-keying or blue screen matting, it would be helpful if both the object video and the background video could be processed in compressed form, especially in distributed systems, such as where the object video, the background video and/or the composite video are generated in different locations.

SUMMARY OF THE INVENTION

The present inventions provide methods and apparatus for combining separate data segments while still in a compressed form, such as mixing two compressed video segments into a single combined video segment, such as a composite, while keeping the two compressed video segments substantially in their compressed formats during processing. In one aspect of the present inventions, methods and apparatus are provided for pixel multiplication in a compressed domain such as the DCT domain, which leads to an efficient scheme for chroma-keying or blue screen matting. By way of example, one aspect of the present inventions provides for direct manipulation of a JPEG or MPEG compressed domain representation to achieve the desired spatial domain chroma-keying.

In accordance with one aspect of the present inventions, methods and apparatus are provided for receiving a plurality of input data segments, which may be arranged in groups such as frames of data in the form of input video data frames. Data segments are received as, or are converted into, a plurality of data elements such as vectors, at least several of which are orthogonal with respect to each other, or can be converted into a form in which they are orthogonal to each other. For example, the data segments can be in the form of input vectors associated with transform representations of input video data frames, and the input vectors can be evaluated to determine which cross-products of those input vectors yield non-zero output vectors. By identifying such input vectors, processing steps such as combining data segments such as video segments into a single data segment can be streamlined by considering only such input vectors and ignoring or reducing the weight accorded to other vectors whose cross products yield zero or negligible output vectors.

In a further form of the inventions, methods and apparatus are provided for determining weighting factors for cross products of input data representations. The weighting factors can be developed as a function of a convolution operation. As a result, the resulting combined data segment will be produced in a way that gives appropriate weight to the respective contributions of the input data segments. For example, a composite video will be produced which preferably gives a more accurate view or representation (visually) of the combined images as though they had been originally recorded with the images combined. In other words, appropriate weight will be given to each contribution from the input video so that the output video has the desired appearance. Similar results are also desirable for combining other forms of data, such as audio segments and other data segments. Moreover, the weighting can be modified as desired to produce other effects.

In a further form of one aspect of the present inventions, a logo keying operation can be performed using the methods and apparatus of the present inventions. For purposes of illustration only of one aspect of the present inventions, FIG. 3 is a high-level functional block diagram of a DCT logo keying operation 300 according to one aspect of the present inventions. The DCT domain keying method of the present inventions facilitates operation in the compressed domain; thus, only entropy coding is used. Generally, a spatial domain pixel multiplication is replaced with a compressed domain DCT convolution operation. Referring again to FIG. 3, conventional entropy decoding 202 and entropy encoding 212 processes may be employed at the beginning and end, respectively, of the operation 300. A DCT logo image is represented by block 302. As described in greater detail below, the output of the entropy decoding block 202 and the DCT logo image block 302 are provided to block 304 which represents DCT domain keying according to one aspect of the present inventions.

However, performing a convolution operation in the DCT domain results in replacing a simpler element-to-element multiplication process with a more complex convolution process. Notwithstanding, the method of one aspect of the present inventions is more efficient than the conventional element-to-element multiplication process because it exploits properties, e.g., symmetry and orthogonality in the DCT convolution function, which are not available in the spatial domain. By way of example, a set of DCT convolution theorems according to one aspect of the present inventions is formed and then used to derive efficient chroma-keying systems which provide a significant reduction in computation complexity.

In the case of chroma-keying, an exemplary preferred method according to another aspect of the present inventions provides that the compressed stream is processed in the compressed (e.g., DCT) domain without explicit decompression and spatial domain keying so that the resulting compressed stream corresponds to a chroma-keyed image. One method disclosed herein ensures that the resulting compressed stream conforms to the standard syntax of 8×8 DCT matrices. For typical data sets, this approach of chroma-keying in the compressed domain results in computation savings of around 70% as compared with traditional spatial domain methods for chroma-keying wherein the data is first decompressed and then keyed in the spatial domain and then re-compressed again for storage or transmission.

In accordance with a specific illustrative embodiment of one aspect of the present inventions, a method for receiving and processing digitized video data in a transform domain includes the steps of: providing a plurality of input video data frames in a transform domain; identifying input vectors associated with the input video data frames; in consideration of an orthogonal characteristic of a convolution function, determining which cross-products of the input vectors would yield non-zero output vectors and determining weighting factors for the cross-products; and generating an output video data frame by determining the cross-products of only the input vectors which would yield non-zero output vectors and by applying the weighting factors to the cross-products.

In a further aspect of the present inventions, the output video data frame represents a chroma-keying or alpha blending operation associated with the input video data frames.

In another aspect of the present inventions, an apparatus includes: a mechanism for receiving a plurality of input video data frames; a mechanism for identifying input vectors associated with a transform representation of the input video data frames; and a mechanism for determining which cross-products of the input vectors would yield non-zero output vectors and for determining weighting factors for the cross-products in consideration of an orthogonal property associated with a convolution operation.

In another aspect of the present inventions, an apparatus operative to receive, process and output digitized data frames includes: machine readable media; and instructions stored on the machine readable media that instruct a machine to receive a plurality of static input data frames associated with an orthogonal transform, identify input vectors associated with the static input data frames, determine contributions of cross-products of the input vectors to output vectors and determine weighting factors for the cross-products in consideration of an orthogonal characteristic of a convolution operation, and generate an output data frame associated with the cross-products and weighting factors.

In a further aspect of the present inventions, the convolution operation is employed to generate the output data frame and includes two discrete cosine transform (DCT) convolutions.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 2 is a functional block diagram of a conventional logo keying operation;

FIG. 3 is a functional block diagram showing DCT domain keying according to one aspect of the present inventions;

FIG. 7A shows a logo-keying process flow for MPEG video in the DCT domain;

FIG. 7B shows a logo-keying process flow for MPEG video in the spatial domain; and FIG. 8 is a flow diagram of an exemplary preferred method according to the present inventions for receiving and processing digitized video data in a transform domain.

DETAILED DESCRIPTION OF THE PREFERRED EMBODIMENTS

Methods and apparatus are described for operating on a plurality of input data segments such as compressed data so as to modify the data without decompressing the data. The methods and apparatus can be used to operate only on data elements that will contribute to the desired data output while ignoring or reducing the contribution of other data segments. The input data segments can take any number of forms, such as video, audio or other forms, and can represent complex items, including moving and still video picture frames, and items of lesser complexity such as moving or still logos, lines and other geometric figures, or data representing information at a pixel level. These methods and apparatus are particularly suited for video and other data editing processes such as chroma-keying, and the like. They can be used to combine still images, such as still logos and still video, moving and still images such as a moving logo having its own motion vector, and still video or still logo and moving video as well as moving images, such as moving logos and moving video. These methods and apparatus are also useful in template matching, such as for extracting or detecting objects and images such as for computer vision or for image analysis. These and other aspects of the present inventions will be considered in more detail below.

Figure 1:
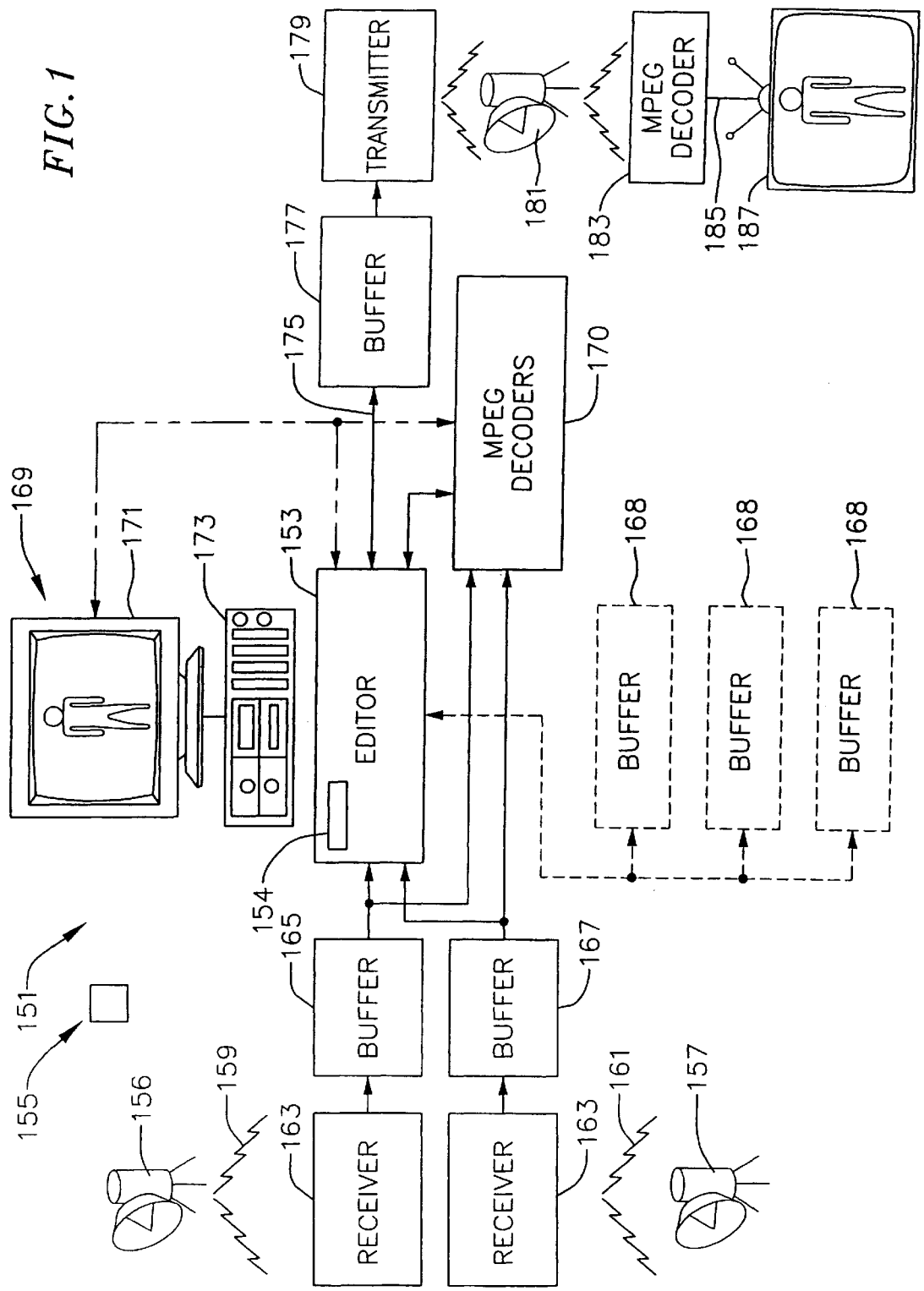
FIG. 1 is an illustrative diagram showing an application for the principles of the present inventions, namely a real-time system for cutting and splicing together two satellite feeds, and forming a composite feed for retransmission to a satellite, such as might be performed by a television network.
Figure 4A:
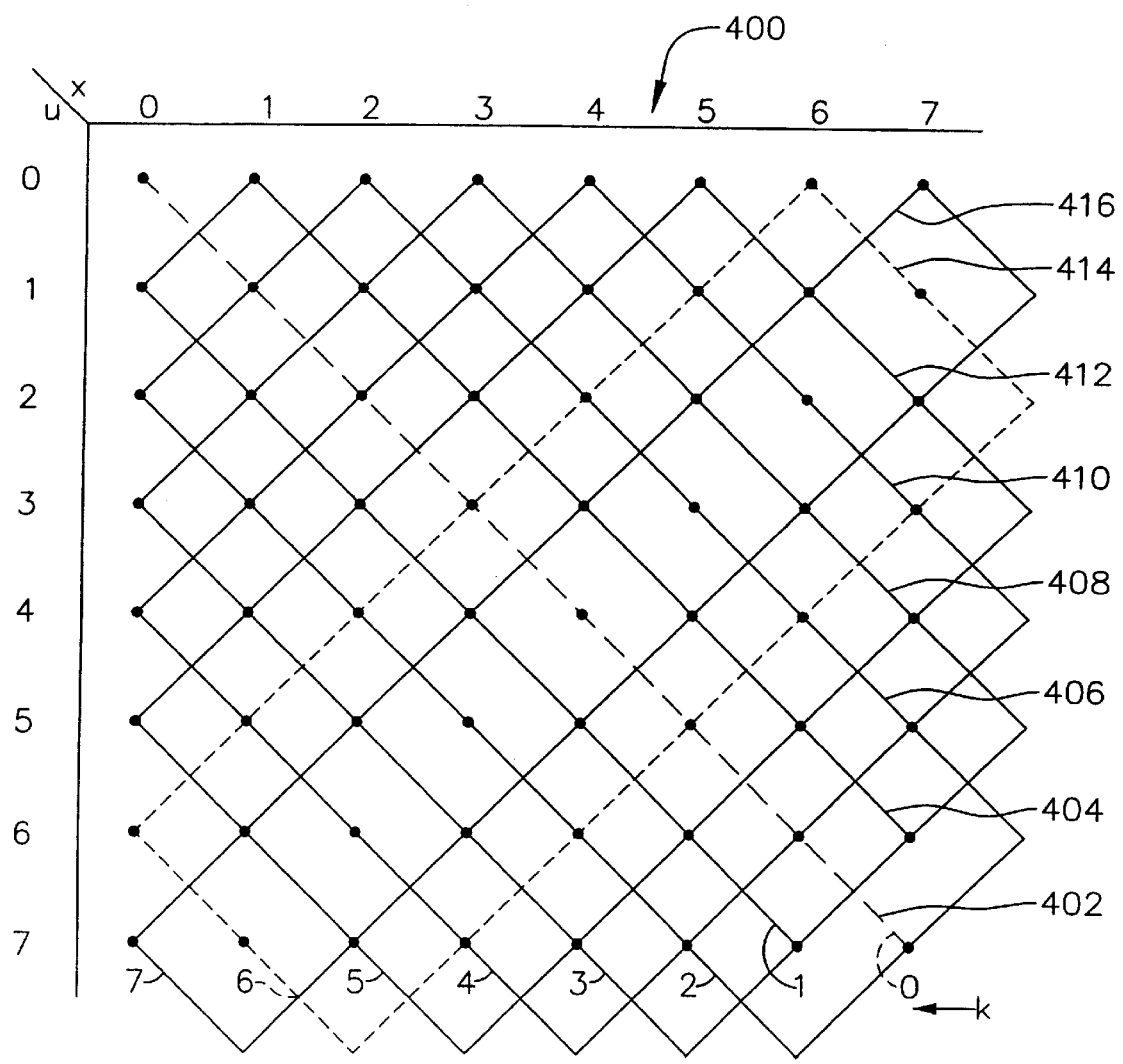
FIGS. 4A–4I show the contribution map of the convolution of two 1D 8-point DCT vectors, FIGS. 4B–4I representing contributions to each of several components of the output vector.
Figure 4B:
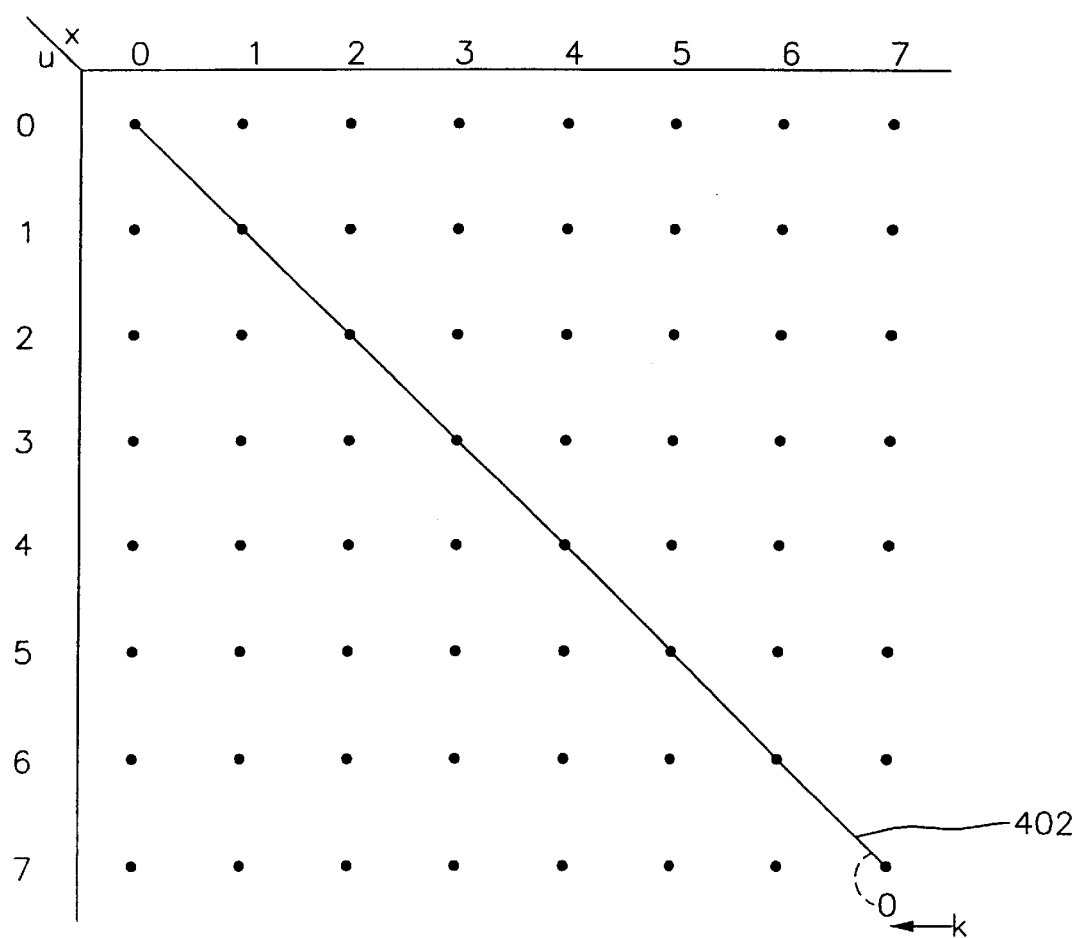
Figure 4C:
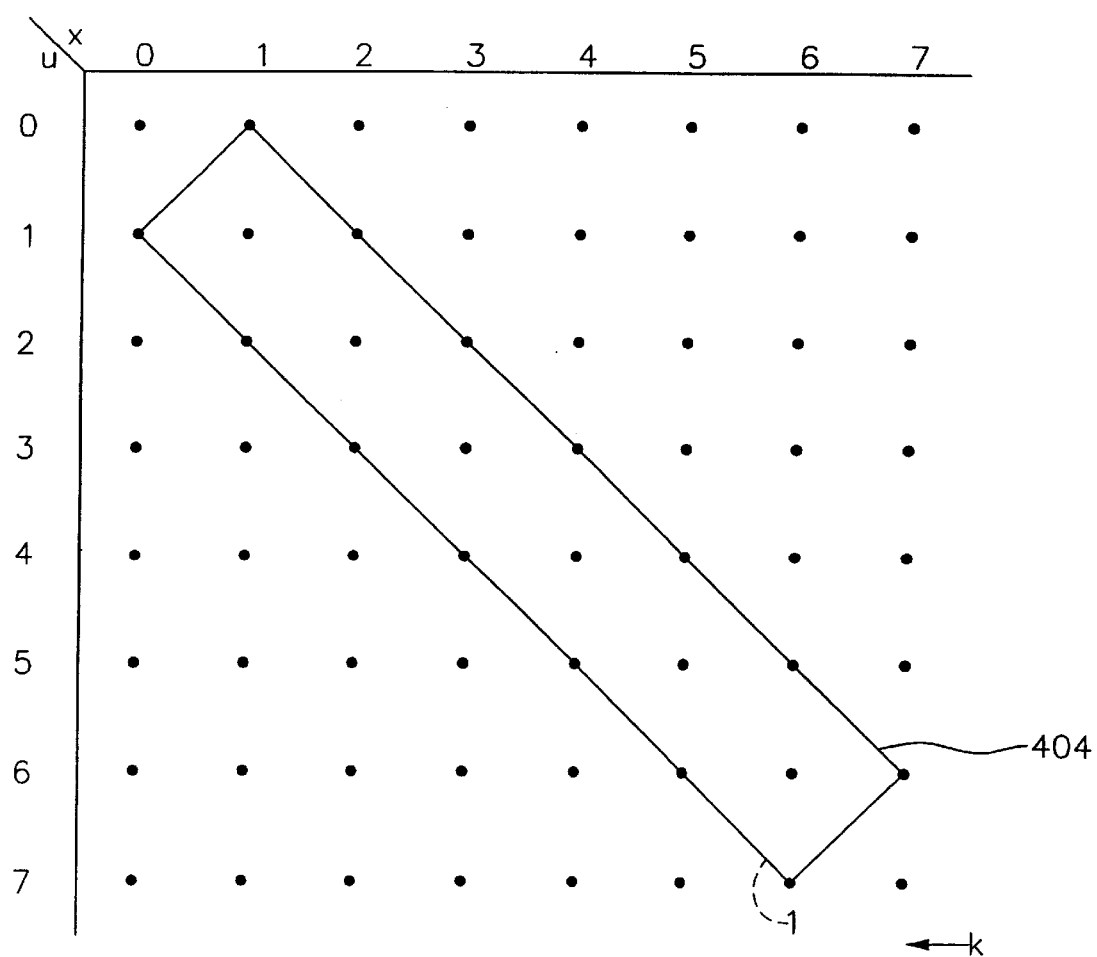
Figure 4D:
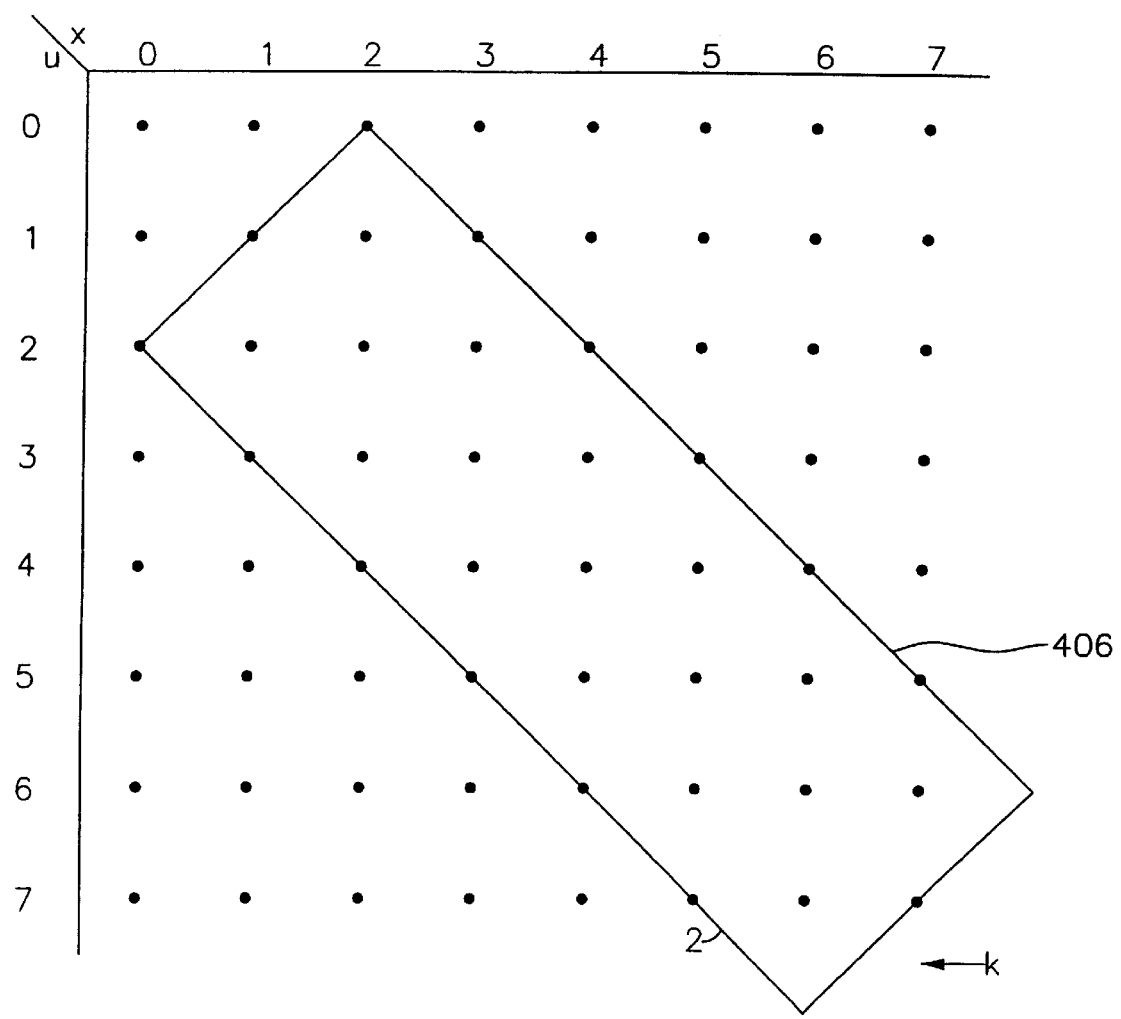
Figure 4E:
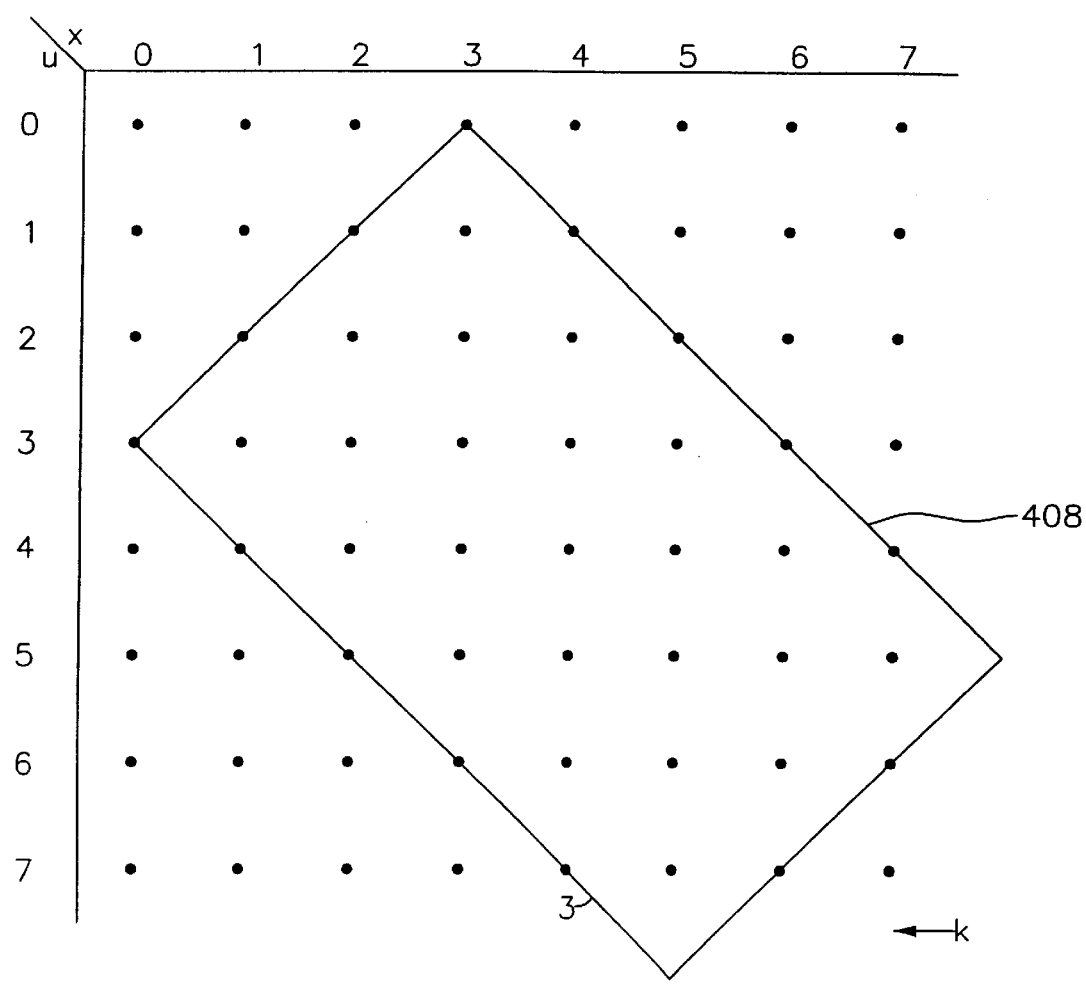
Figure 4F:
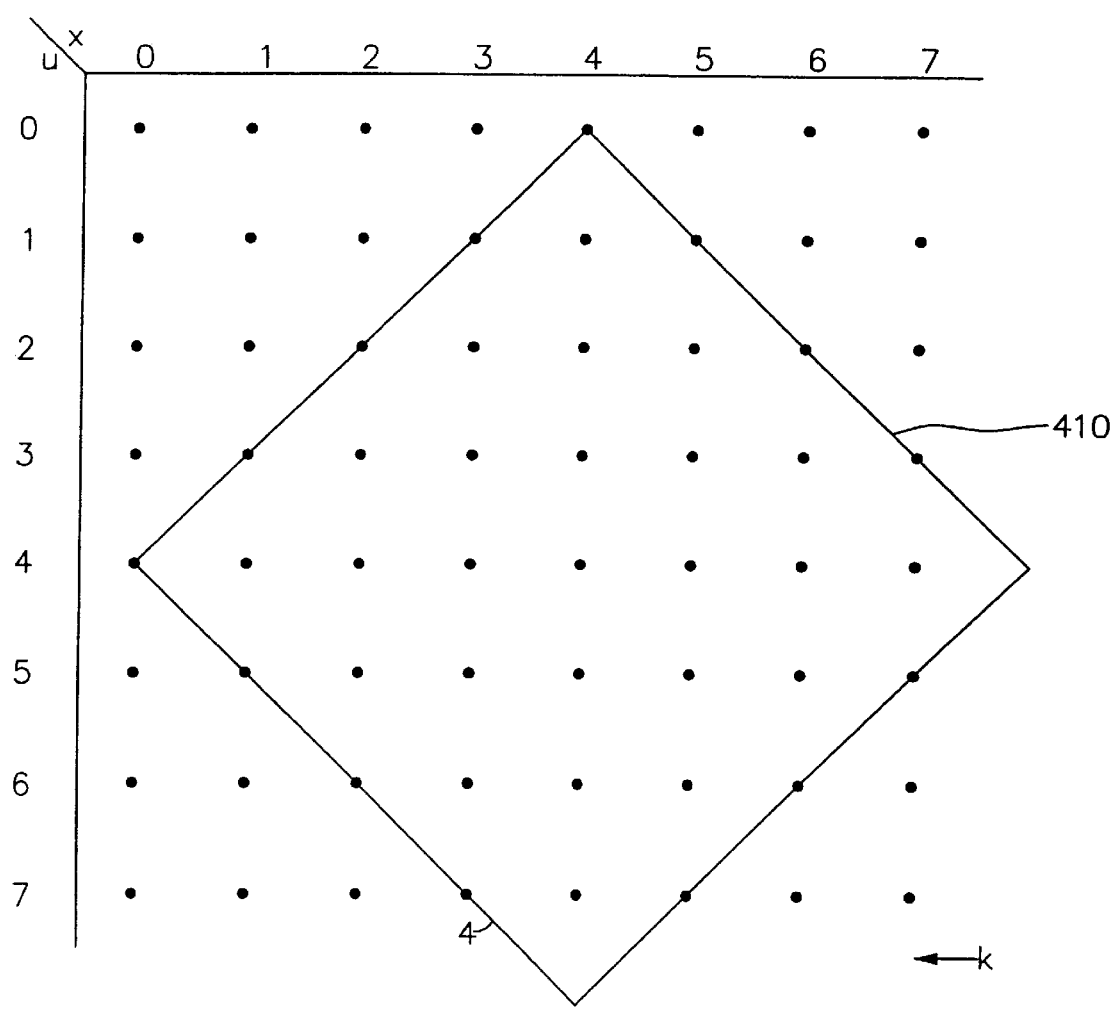
Figure 4G:
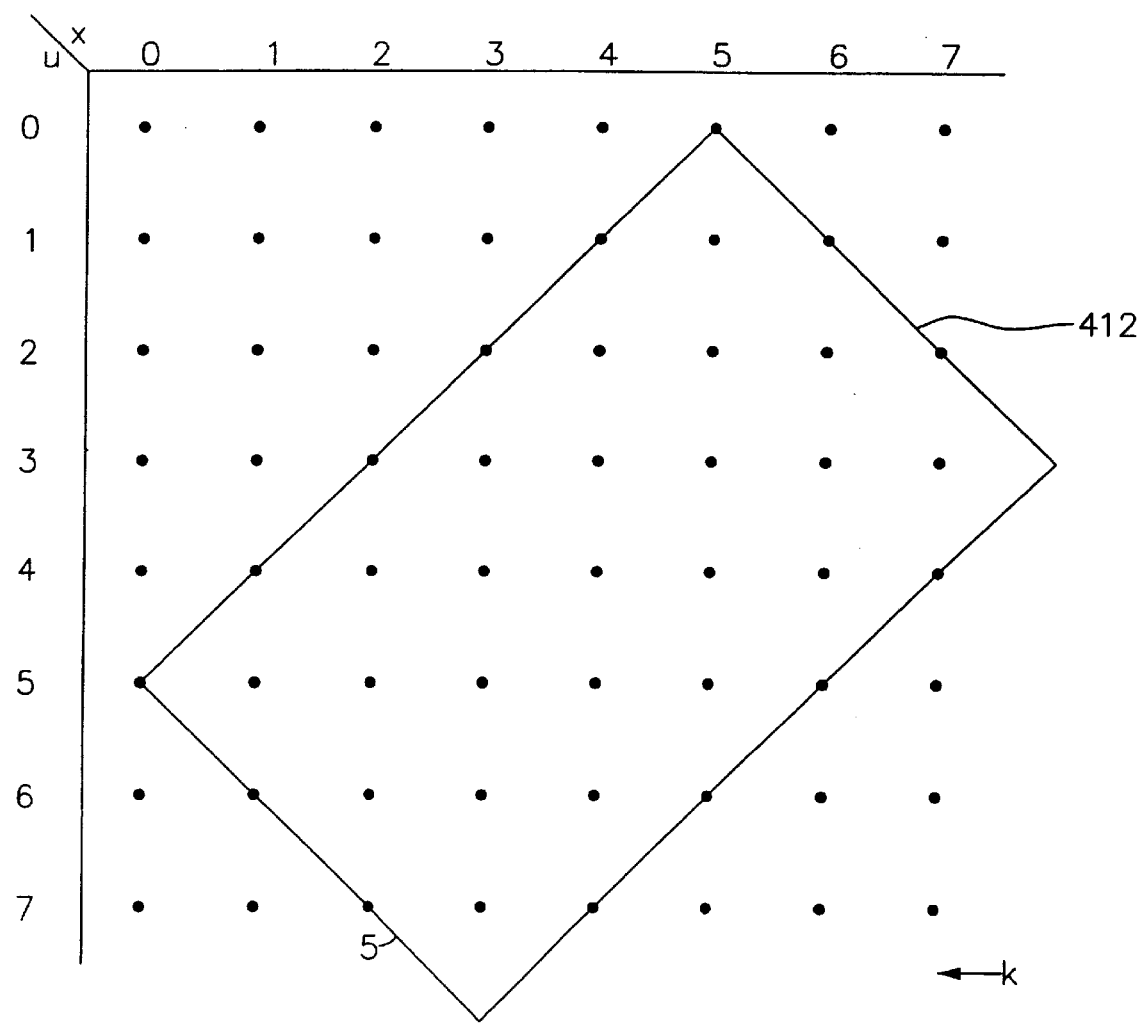
Figure 4H:
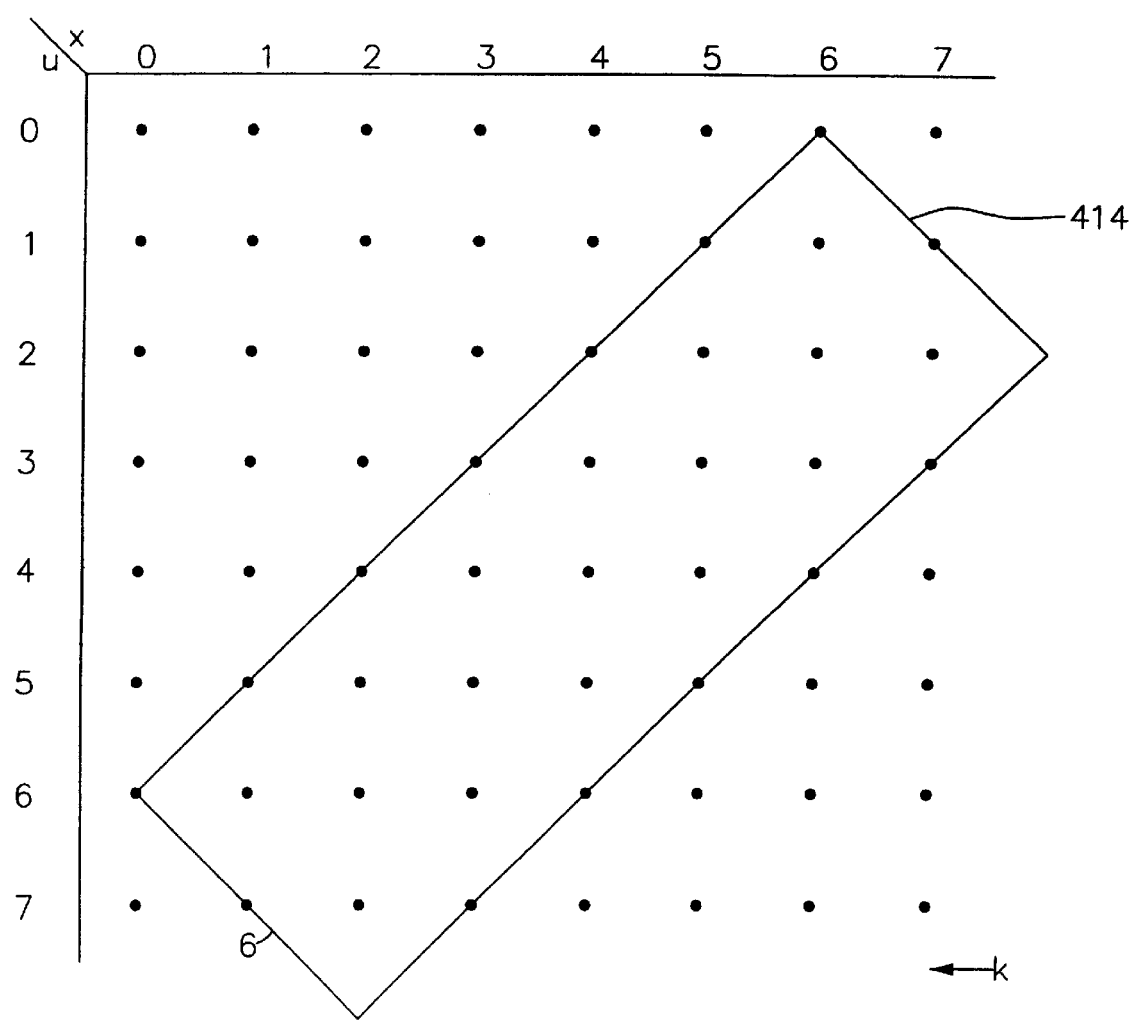
Figure 4I:
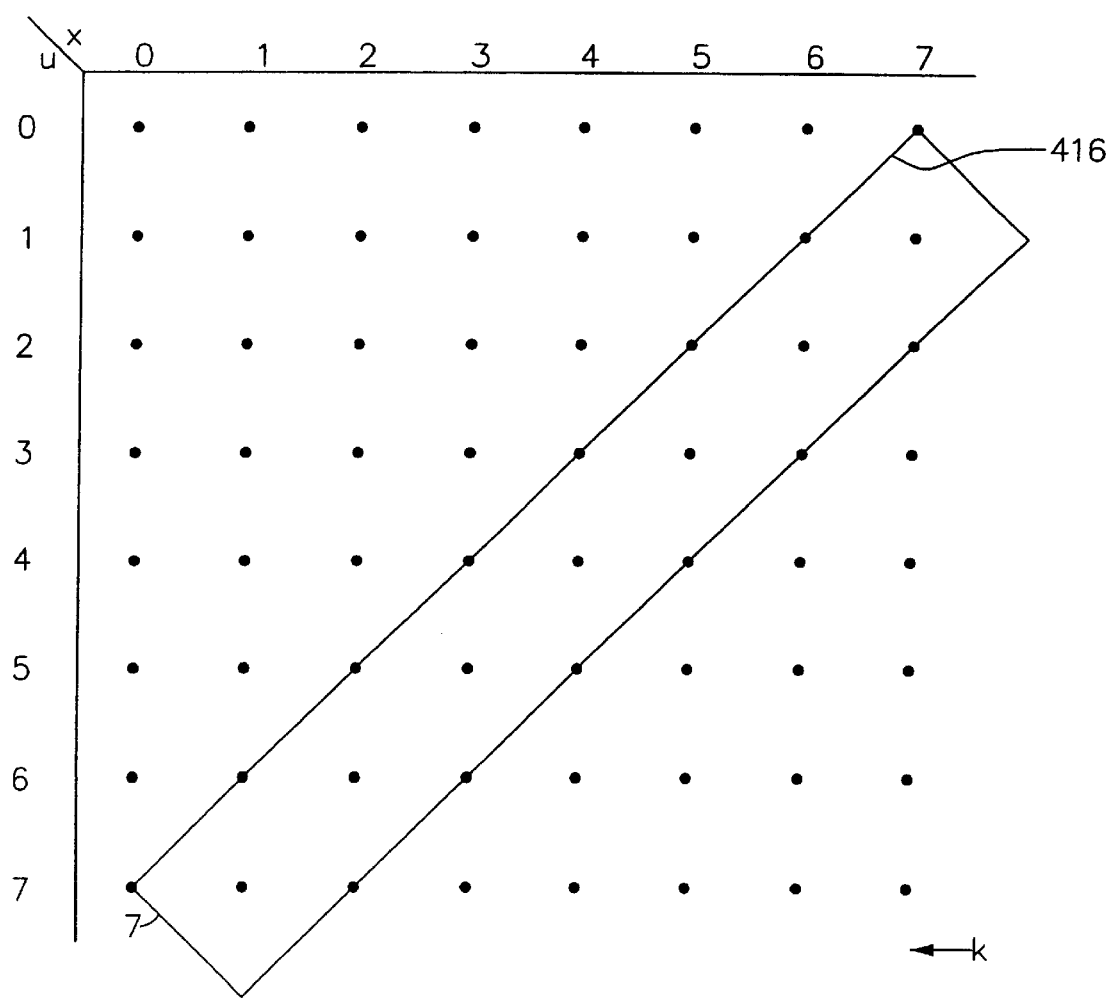

FIG. 1 illustrates a typical application 151 for an editor 153 which implements principles of the present inventions, namely, a real-time application which involves chroma-keying compressed signals from a satellite feed. The editor 153 preferably includes a media reading and writing device 154 (such as a disk drive) which serves as an interface for receiving and/or sending instructions encoded on a storage medium 155 (such as a floppy disk.) It should be understood, however, that the principles of the present inventions are not limited to video editors and are equally applicable to audio. Furthermore, the media reading device 154 can be replaced by an interface (such as a modem) providing the editor 153 with access to remotely stored instructions or other control software and a receiving/sending unit for receiving data and/or instructions, and sending data.

The system illustrated in FIG. 1 includes two satellites 156 and 157 which transmit two different compressed image signals, for example, two different sports games. The transmissions, represented by reference numerals 159 and 161, are received by one or more receivers 163 and fed to corresponding input buffers 165 and 167. Without leaving the compressed domain, or performing an IDCT, the preferred editor 153 operates under the control of a user interface 169, to mix and otherwise modify the two compressed images signals as desired. Preferably, the system includes (in parallel with the editor and associated buffers 168) one or more MPEG decoders 170 which are used to display images using the user interface. For example, the user interface can include one or more monitors 171 and a keyboard 173, and can concurrently display several image windows such as one corresponding to each transmission 159 and 161, as well as to an output 175 of the editor. With the user interface, a person controlling the editor 153 can cause the editor to switch the output between several image signals, such as between the two sports games, or to mix commercials with a live satellite transmission, employing keying operations as desired.

The output 175 is fed to an output image buffer 177, and from there to a transmitter 179 for transmitting a composite satellite signal to satellite 181. The signal can then be received by a local company receiving station, and transmitted via cable 185 or otherwise to individual television subscribers, represented by the reference numeral 187.

It should be understood that the application just discussed, namely, which involves satellite feeds and editors, is but one application for the preferred process, which may be applied elsewhere as well, for example, in post-production houses, or as software for use upon individual personal computers for graphics or video conferencing applications.

By way of overview, a specific DCT domain convolution method and then its use in chroma-keying are described. The preferred embodiments will now be discussed in additional detail.

In the interest of clarity, a one-dimensional ("1-D") DCT is discussed below. The 1-D DCT is extended to the two-dimensional ("2-D") case by concatenating rows/columns in 2-D blocks. The DCT F of a spatial-domain sequence f of size N can be expressed as $$F_j = \alpha(j) \sum_{i=0}^{N-1} C_{i,j} f_i \tag{1}$$

where $$C_{i,j} = \cos \frac{(2i+1)j\pi}{2N}, \text{ and,}$$

$$\alpha(j) = \begin{cases} \frac{1}{\sqrt{N}}, & \text{if } j = 0 \\ \sqrt{\frac{2}{N}}, & \text{if } j \in [1, N-1]. \end{cases} \tag{2}$$

Each component of the spatial-domain sample f can be reconstructed using the inverse DCT (IDCT) as $$f_j = \sum_{i=0}^{N-1} \alpha(i) C_{j,i} F_i. \tag{3}$$

Two spatial domain vectors f and g of size N have DCT representations as vectors of size N, namely, F and G. For purposes of this discussion, spatial domain vector h is defined as the vector resulting from the element-by-element (pixel-wise) multiplication between f and g, and H is defined as the DCT of h. With (·) used to represent the element by element multiplication, $$h = (f \cdot g) \tag{4}$$

and from (3), this can be expressed as $$h_j = f_j \times g_j \tag{5}$$

$$= \sum_{x=0}^{N-1} \sum_{u=0}^{N-1} \alpha(x) \alpha(u) C_{j,x} C_{j,u} F_x G_u.$$

Since only the DCT-domain vectors F and G (not f and g) are available from the JPEG or MPEG compressed bit streams, H is computed directly from F and G according to one aspect of the present inventions. From (Equation 1) and (Equation 5), each component of H can be expressed as $$H_k = \alpha(k) \sum_{i=0}^{N-1} C_{i,k} h_i \tag{6}$$

$$= \alpha(k) \sum_{i=0}^{N-1} C_{i,k} \left( \sum_{x=0}^{N-1} \sum_{u=0}^{N-1} \alpha(x) \alpha(u) C_{i,x} C_{i,u} F_x G_u \right).$$

Additionally, (Equation 6) can be rearranged to be expressed as:

$$H_k = \sum_{x=0}^{N-1} \sum_{u=0}^{N-1} W_{k,x,u} F_x G_u \text{ where} \tag{7}$$

$$W_{k,x,u} = \alpha(k) \alpha(x) \alpha(u) \sum_{i=0}^{N-1} C_{i,k} C_{i,x} C_{i,u}. \tag{8}$$

Accordingly, (Equation 7) demonstrates that the spatial-domain pixel-wise multiplication of (Equation 4) can be expressed as a convolution operation in the DCT domain.

Ignoring the cost of performing two IDCTs and one DCT, the spatial domain pixel multiplication approach of (Equation 4) uses N multiplications, whereas the DCT domain counterpart actually costs more in that it uses the magnitude of $N^3$ multiplications for vectors of size N. However, recall that F and G are DCT vectors and, in typical JPEG/MPEG compressed bit streams, many of the components of these vectors will be zero-valued. Thus, in practice, DCT-domain convolution between F and G uses $N_F \times N_G \times N$ multiplications ($N_F$ and $N_G$ representing the number of non-zero coefficients in F and G respectively). Furthermore, in Brian Smith and Larry Rowe, "Algorithms for manipulating compressed images," *IEEE Computer Graphics and Applications*, pp. 34–42, Sept. 1993, which is incorporated herein by reference, it was observed that most of the entries in matrix W of (Equation 8) are very small; therefore, a threshold can be selected to set most of the elements of this matrix to zero and then the non-zero components can be saved in a link-list data structure for fast skipping of zeroes. Thus, computation complexity is reduced to: $N_F \times N_G \times N_W$ with $N_W$ representing the average number of non-zero $W_{k,x,u}$ for each fixed k.

Since only the non-zero DCT coefficients are used in the convolution process, convolution in the DCT domain may turn out to have a lower computation complexity than the spatial-domain approach as shown here. However, the sparseness of the DCT-domain representation alone may not yield a lower operations count. On the other hand, setting a threshold to force W to be a sparse matrix is also ad hoc. According to one aspect of the present inventions, a theorem shows which choices of k make $W_{k,x,u}$ zero, in order to reduce the number of computations used. In accordance with one aspect of the present inventions, a processor can take advantage of orthogonality that is present or can be developed in the data, to simplify the processing of the data. Therefore, a threshold need not be imposed on W to force it to be sparse. The sparseness of $W_{k,x,u}$ can then be used in the computing of (Equation 7) to reduce the complexity in computing $H_k$.

Theorem. For DCT vectors F and G of size N and their corresponding IDCT vectors f and g, let G be the DCT of the pixel multiplication between f and g. Then each cross-product between $F_x$, a component in F, and $G_u$, a component in G, contributes to no more than two components $H_m$ and $H_n$ in the resulting DCT output vector H and the indices m and n are as given below:

$$m = \begin{cases} x+u & \text{if } x+u < N \\ 2N-(x+u) & \text{if } x+u > N \\ \phi(\text{null}) & \text{if } x+u = N \end{cases} \tag{9}$$

$$n = |x-u|.$$

This theorem implies that independent of the value of N, $F_x \times G_u$ contributes by a weighting factor to no more than two (four in 2D case) components in the output vector $H_k$.

FIG. 4 shows the contribution map 400 of the convolution of two 1D 8-point DCT vectors. One pair of input indices x and u is mapped to one or two output indices k. Each dot indicates a cross-product of $F_x \times G_u$. If a line is used to connect all dots which contribute to the same output $H_k$, a contribution map is constructed (observe each line as a closed rectangle with diagonal orientation). For instance, the contribution to $H_0$ from $F_x \times G_u$ are from (x,u)=(0,0), (1,1), (2,2) on to (7,7), represented by diagonal line 402. The contribution of coefficients from $F_x \times G_u$ to $H_0$ is shown at 402 in FIG. 4B. The contribution to $H_1$ when k=1 from $F_x \times G_u$ are from (x,u)=(1,0), (2,1), (3,2) on to (7,6), and from (6,7), (5,6) back to (0,1) (represented by rectangle 404; see also FIG. 4C). The contribution to $H_2$ when k=2 from $F_x \times G_u$ are from (x,u)=(2,0), (3,1), (4,2) on to (7,5), then to (7,7) and from (5,7), (4,6) back to (0,2) and (1,1) (represented by rectangle 406; see also FIG. 4D). The contribution to $H_3$ when k=3 from $F_x \times G_u$ are from (x,u)=(3,0), (4,1), (5,2) on to (7,4), then to (7,6) and (6,7), and from (4,7), (3,6) back to (0,3), and then (1,2) and (2,1) (represented by rectangle 408; see also FIG. 4E). The contribution to $H_4$ when k=4 from $F_x \times G_u$ are from (x,u)=(4,0), (5,1), (6,2) on to (7,3), then to (7,5), (6,6) and (5,7), and from (3,7), (2,6) back to (0,4), and then (1,3), (2,2) and (3,1) (represented by square 410; see also FIG. 4F). The contribution to $H_5$ when k=5 from $F_x \times G_u$ are from (x,u)=(5,0), (6,1), (7,2) on to (7,4), (6,5), (5,6) and (4,7) then from (2,7) to (0,5) and from (1,4) back to (4,1) (represented by rectangle 412; see also FIG. 4G). Likewise, the contribution to $H_6$ when k=6 from $F_x \times G_u$ is represented by rectangle 414 in FIG. 4H. For example, line 6 passes the dot at (x,u)=(2,4), which indicates that $F_2 \times G_4$ contributes to $H_6$. The contribution to $H_7$ when k=7 from $F_x \times G_u$ is represented by rectangle 416 in FIG. 4I. Similar relationships can be mapped for DCT vectors of other sizes, and also for two dimensional configurations. These relationships make the calculations used to obtain $H_k$ much quicker and easier than with conventional methods.

According to one aspect of the present inventions, an efficient algorithm for computing $H_k$ in (Equation 7) can be developed by observing that the entries in W have only three possible non-zero values:

$$\sqrt{\frac{1}{N}} \text{ and } \pm \sqrt{\frac{1}{2N}}.$$

Table 1 (below) shows the weight factors $W_{m,x,u}$, $W_{n,x,u}$ for each cross-product of $F_x \times G_u$ in the 1D 8-point DCT case where $$a = \frac{\sqrt{2}}{4} \text{ and } b = \frac{1}{4}.$$

TABLE 1

| | Weighting factor | | | | | | | |
|---|---|---|---|---|---|---|---|---|
| | u | | | | | | | |
| x | 0 | 1 | 2 | 3 | 4 | 5 | 6 | 7 |
| 0 | a, a | a, a | a, a | a, a | a, a | a, a | a, a | a, a |
| 1 | a, a | b, a | b, b | b, b | b, b | b, b | b, b | , b |
| 2 | a, a | b, b | b, a | b, b | b, b | b, b | , b | −b, a |
| 3 | a, a | b, b | b, b | b, a | b, b | , b | −b, a | −b, a |
| 4 | a, a | b, b | b, b | b, b | , a | −b, a | −b, a | −b, a |

TABLE 1-continued

| | Weighting factor | | | | | | | |
|---|---|---|---|---|---|---|---|---|
| | u | | | | | | | |
| x | 0 | 1 | 2 | 3 | 4 | 5 | 6 | 7 |
| 5 | a, a | b, b | b, b | , b | −b, a | −b, a | −b, a | −b, a |
| 6 | a, a | b, b | , b | −b, a | −b, a | −b, a | −b, a | −b, a |
| 7 | a, a | , b | −b, a | −b, a | −b, a | −b, a | −b, a | −b, a |

For the two-dimensional (2-D) 8×8 block case, a contribution map and a weighting factor table can be similarly generated. In the 2-D case, each element of W matrix takes on one of five possible non-zero values $$\frac{1}{8}, \pm\frac{1}{16}, \pm\frac{\sqrt{2}}{16}.$$

Each cross-product contributes to between one to four components in the output block. If every cross-product contributes to exactly one output component (best case), the operations used for computing (Equation 7) are $2N_F \times N_G$ multiplications and $(N_F \times N_G - 1)$ additions. If every cross-product contributes to four output components (worst case), the operations used for computing (Equation 7) are $5N_F \times N_G$ multiplications and $4(N_F \times N_G - 1)$ additions. A complete enumeration of multiplications and additions for each $H_k$ in (Equation 7) using the data in Table 1 indicates, that on the average, each cross-product $F_x \times G_u$ contributes to 2.74 output components in H. Hence, the operations used for computing (Equation 7) using the orthogonality property are 3.74 $(N_F \times N_G)$ multiplications and 2.74 $(N_F \times N_G - 1)$ additions. It should be noted that the multiplications by W can be readily performed with single shift operations or in some cases approximated by a series of shift operations.

The DCT domain convolution operation can be further simplified if desired by exploiting the symmetry in the mapping from x,u to k. For instance, it can be shown that $F_1 \times G_2$, $F_6 \times G_7$, $F_2 \times G_1$ and $F_7 \times G_6$, represented as symmetric locations in the x,u,k mapping, contribute to $H_1$ and $H_3$. This symmetry property can be exploited to further reduce the number of multiplications used in the computing of (Equation 7). To this end, (Equation 7) can be expressed formally as $$H_k = \sum_{x=0}^{N-2} \sum_{u=x+1}^{N-1} W_{k,x,u}(F_x G_u + F_u G_x) + \sum_{x=0}^{N-1} W_{k,x,x} F_x G_x. \qquad (10)$$

This equation indicates that if $F_x \times G_u$ and $F_u \times G_x$ are both non-zero, their multiplications with the weighting factor can be merged, thereby reducing half of the computation. If β is used to represent the percentage of the aforementioned case (where $F_x \times G_u$ and $F_u \times G_x$ are non-zero) in all cross-products, the number of multiplications used by (Equation 10) is $$\frac{3.74}{1+\beta} N_F \times N_G,$$

where $0 \leq \beta \leq 1$.

Therefore, the number of computations is reduced in part by exploiting the symmetry in the mapping from x,u to k.

The DCT domain convolution method of one aspect of the present inventions as used in chroma-keying is discussed below. Chroma-keying in the spatial-domain can be expressed as the following operation: h=α·f+(1−α)·g. Here, given two images, f and g, f is keyed onto g to generate the output image h. The alpha channel is used to determine the transparency of each pixel in f (α=0 implies background, α=1 implies foreground, and 0<α<1 implies partial transparency for the pixel). Hence the operation (α·f) will extract out the foreground object from f.

The corresponding DCT-domain based calculations for alpha blending can be expressed as $$H = A \overset{W}{\otimes} F + (1-A) \overset{W}{\otimes} G, \quad (11)$$

where, A is the DCT of α. Here, the $$\overset{W}{\otimes}$$

operator indicates the operation defined in (Equation 7) and is the DCT-domain convolution between two vectors with the weighting vector W.

A complete alpha blending or chroma-keying operation is composed of two DCT-domain convolutions. The first term of (Equation 11) is the logo-keying operation, wherein the logo image serves as the alpha channel.

Figure 5A:
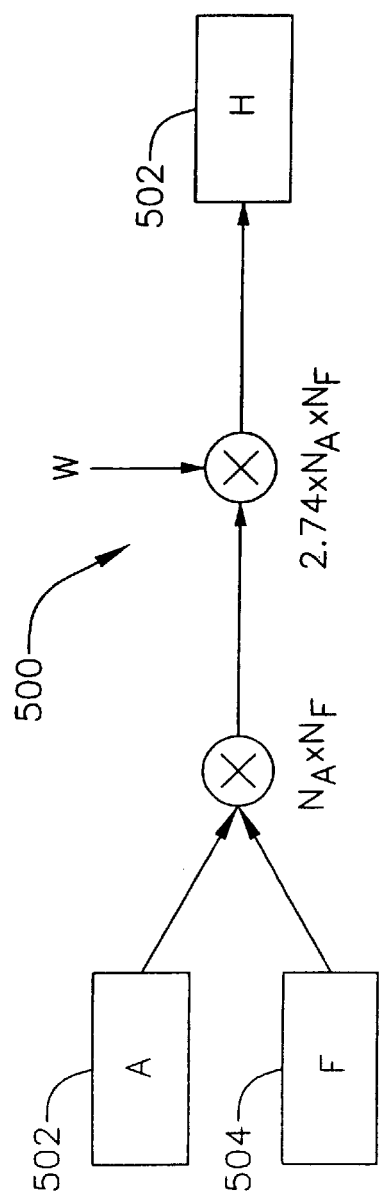
FIG. 5A shows a process flow for a logo-keying operation in the DCT domain.

FIG. 5A is a processing flow 500 for this DCT-domain convolution between two vectors with the weighting vector W. The DCT vectors A and F are represented by blocks 502, 504, respectively. The resulting DCT vector H is represented by block 506.

Figure 5B:
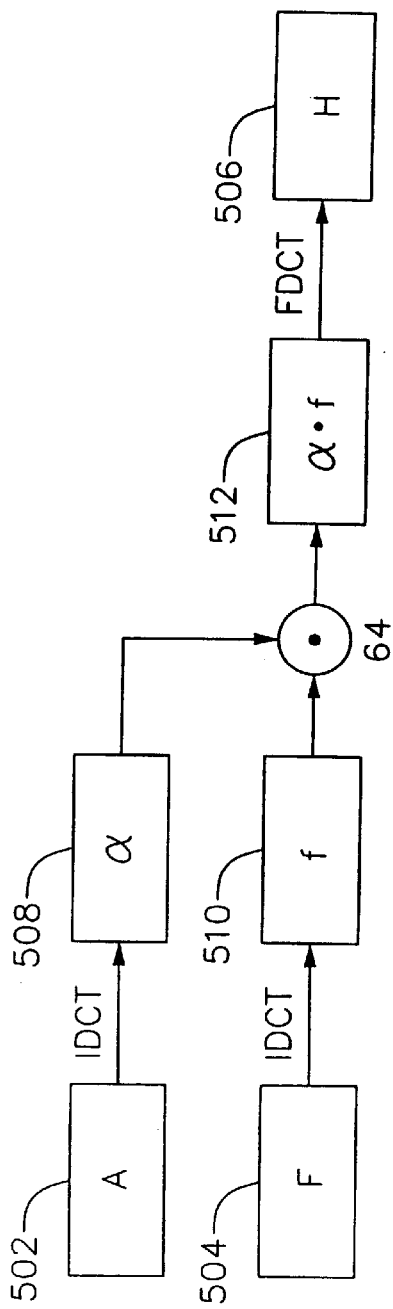
FIG. 5B shows a process flow for a logo-keying operation in the spatial domain.

The processing flow for the corresponding spatial-domain based approach is shown in FIG. 5B. According to the spatial-domain approach, IDCTs are performed on the DCT vectors A and F yielding α and f, which are represented by blocks 508, 510, respectively. As discussed above, for the two images, f and g, f is keyed onto g at block 512 to generate the output image h.

The computations involved for both approaches are shown in Table 2 (below, relating to a still picture). For the spatial-domain case, fast FDCT and IDCT algorithms developed in Y. Arai, T. Agui and M. Nakajima, "A Fast DCT-SQ Scheme for Images," *Trans. of IEICE,* vol. E71, no. 11, Nov. 1988, which is incorporated herein by reference, were used. Since the spatial-domain approach uses an IDCT and a FDCT, direct mapping algorithms such as those disclosed in A. C. Hung and T. H. Meng, "Statistical Inverse Discrete Cosine Transforms for Image Compression," *Proc. SPIE Electronic Imaging,* vol. 2187, pp. 196–205, 1994, which is incorporated herein by reference, may not be good choices since they yield an efficient IDCT but the FDCT cost is quite high compared with the Arai et al. method.

TABLE 2

Complexity of spatial-domain versus DCT domain compositing when A varies from frame to frame. Spatial-1 refers to the case when DCT data is nonsparse. Spatial-2 refers to the case when there are $N_F$ and $N_A$ nonzero coefficients in DCTs F and A.

| Processing Domain | Multiplications | Additions |
| --- | --- | --- |
| Spatial-1 | | |
| Two IDCTs | 2 × 80 = 160 | 2 × 464 = 928 |
| Pixel Multiplication | 64 | 0 |
| One FDCT | 80 | 464 |
| TOTAL | 304 | 1392 |

TABLE 2-continued

Complexity of spatial-domain versus DCT domain compositing when A varies from frame to frame. Spatial-1 refers to the case when DCT data is nonsparse. Spatial-2 refers to the case when there are $N_F$ and $N_A$ nonzero coefficients in DCTs F and A.

| Processing Domain | Multiplications | Additions |
| --- | --- | --- |
| Spatial-2 | | |
| Two IDCTs −7 nonzero coeff./block | 2 × 56 = 112 | 2 × 160 = 320 |
| Pixel Multiplication | 64 | 0 |
| One FDCT | 80 | 464 |
| TOTAL | 256 | 784 |
| DCT | | |
| Brute force ($N_A = N_F = 64$) | 65 ($N_A × N_F$) 266240 | 64 ($N_A × N_F$-1) 262080 |
| Sparseness only ($N_A = N_F = 7$) | 65 ($N_A × N_F$) 3185 | 64 ($N_A × N_F$-1) 3072 |
| With Orthogonality ($N_A = N_F = 7$) | 3.74 $N_A × N_F$ 183.26 | 2.74 ($N_A × N_F$-1) 131.52 |
| With Symmetry (best case) ($N_A = N_F = 7$) | 1.57 $N_A × N_F$ 91.63 | 2.74 ($N_A × N_F$-1) 131.52 |

From Table 2, it can be seen that without any assumptions on sparseness of the DCT data, DCT-domain based logo keying employing a brute-force calculation of the convolution as per (Equation 7) uses substantially more multiplications and additions than the spatial-domain approach. For typical image and video data, DCT blocks have around 7–16 nonzero coefficients. If it is assumed, for example, that there are only 7 non-zero DCT coefficients ($N_A = N_F = 7$) in Table 2, a brute-force calculation of DCT domain convolution for sparse DCT data could still be computationally more expensive than the spatial-domain approach. However, if the DCT-domain convolution exploiting orthogonality property as developed above is used, under the same assumptions of data sparseness, for each output 8×8 DCT block, 183 multiplications and 132 additions may be used. Assuming both multiplication and addition have the same computation cost, this represents 80% fewer computations than a spatial-domain approach such as Spatial-1 in Table 2. If a fast IDCT method specifically tailored to the sparse data is used in the spatial-domain based keying approach, the DCT domain convolution approach disclosed herein has only 30% of the computation complexity of the spatial-domain approach. If the DCT-domain symmetry property is exploited, the computation complexity of the DCT-domain scheme can be reduced significantly compared to only exploiting the orthogonality property.

Figure 6:
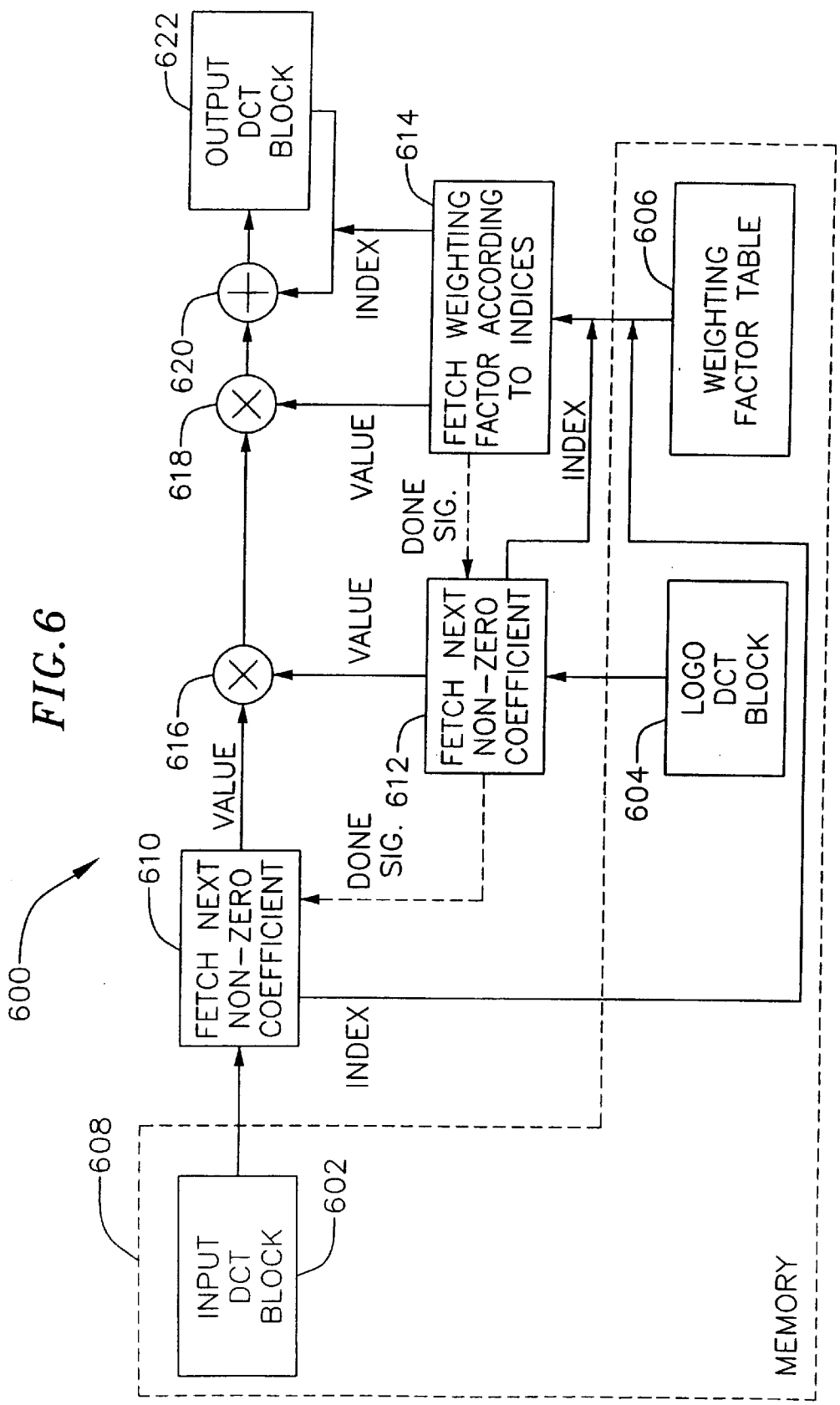
FIG. 6 is a detailed functional flow diagram for a DCT domain logo-keying system according to an exemplary preferred embodiment of the present inventions.

Turning to FIG. 6, an exemplary preferred logo keying system 600 is shown. An input DCT block 602, logo DCT block 604 and weighting factor table 606 provide inputs to the system 600. These inputs can be, but are not necessarily, stored in a memory device which is shown by a dashed line 608. The system 600 also includes fetching units 610, 612, 614. The fetching unit 610 receives the background image information from the DCT block 602. The fetching unit 612 receives the logo image information from the logo DCT block 604. The fetching unit 614 fetches weighting factors according to indices that it receives from the fetching units 610, 612.

Preferably, only non-zero coefficients in DCT blocks within the background image and logo image are fetched. When the fetching unit receives a "Done" signal, it starts to fetch the next non-zero coefficients in the DCT block. The exemplary preferred system 600 only includes two multiplication units 616, 618 and one addition unit 620 interconnected with the fetching units 610, 612, 614 and an output DCT block 622 as shown. The output is already in DCT form. Therefore, no forward DCT is used. It should be understood that the principles of the present inventions are not limited to video logo keying, but also embrace the keying or blending of other images as well.

The DCT-domain convolution method for chroma-keying according to one aspect of the present inventions is readily extended to MPEG video containing I, P and B frames. For I frames, the DCT-domain keying procedure described above can be used directly. For P frames, the keying operation depends on the type of macroblock within these frames:

Intra macroblock: Such a macroblock contains four intra coded blocks. The DCT domain keying procedure developed in the previous sections can be used.

Skipped macroblock: The macroblock is the same as the corresponding macroblock in reference frame. Since the keying operation has been performed for the reference macroblock, hence, retaining this macroblock as a skipped macroblock provides the desired keying effect. This means that no operation is used for the skipped macroblocks.

Predicted macroblock with zero-valued motion vectors: Keying can be performed on this difference block directly without reconstructing it. There are certain blocks that are not coded at all (indicated by a coded-block-pattern in the macroblock header). The not coded block indicates that the residual is zero, and for such blocks the keying operation does not need to be performed.

Predicted macroblock with nonzero-valued motion vectors: The inverse motion compensation technique in U.S. Pat. No. 5,708,732 entitled "Fast DCT-Domain Downsampling and Inverse Motion Compensation" to N. Merhav and V. Bhaskaran, which is incorporated herein by reference, can be used to generate an intraframe DCT representation from the corresponding interframe DCT representation. Keying can then be performed on the intraframe DCT representation as discussed in the previous sections.

The operations can be extended to B frames with minor modifications. For any frames other than I-picture frames, namely P-picture frames and B-picture frames, frames are converted to "intra-" form using DCT domain inverse motion compensation. The DCT representation of those frames as independent frames can be obtained using the methods described in U.S. Pat. No. 5,708,732, incorporated herein by reference. The methods of the present inventions can then be used in the DCT domain to process the converted independent frames. The methods of the present inventions and U.S. Pat. No. 5,708,732 can be used to operate on non-still or stationary pictures.

FIG. 7A shows a logo-keying process flow 700 for MPEG video in the DCT domain. The process is represented by an entropy docoder block 702, a DCT domain keying block 704, a DCT domain inverse motion compensation block 706 and an adder 708 functionally interconnected as shown. The entropy docoder block 702 and the DCT domain keying block 704 are the same as the corresponding blocks discussed with reference to FIG. 3. In a preferred embodiment, the DCT domain inverse motion compensation block 706 implements the techniques disclosed in U.S. Pat. No. 5,708,732 to provide "static" frames for DCT domain keying. It should be understood, however, that chroma-keying extended to MPEG video according to the present inventions is not limited to employing the techniques disclosed in U.S. Pat. No. 5,708,732. The "static" frames for DCT domain keying generally comprise blocks that do not depend upon data from other frames. In other words, the "static" frames of input video data comprise blocks that correspond to spatial domain blocks in only the current picture.

By way of comparison, FIG. 7B shows a logo-keying process flow 750 for MPEG video in the spatial domain. The process is represented by an entropy docoder block 702, an IDCT block 752, a spatial domain keying block 754, an FDCT block 756, an inverse motion compensation block 758 and an adder 760 functionally interconnected as shown. The entropy docoder block 702, IDCT block 752, spatial domain keying block 754 and FDCT block 756 are the same as the corresponding blocks discussed with reference to FIG. 2. A conventional inverse motion compensation operation is performed at block 758.

By way of review, FIG. 8 illustrates via flow diagram 800 an exemplary preferred method according to the present inventions for receiving and processing digitized video data in a transform domain. In executable block 802, input video data frames in a transform domain are provided. In an exemplary preferred embodiment, the transform domain is a DCT transform domain and the frames are "static" as discussed supra. In an exemplary chroma-keying application, the input video data frames are a background image frame and a logo image frame. Next, at executable block 804, input vectors associated with the input video data frames are identified. Following this, at executable block 806, it is determined, in consideration of an orthogonal characteristic of a convolution function, which cross-products of the input vectors would yield non-zero output vectors and weighting factors for the cross-products are determined. Next, at executable block 808, an output video data frame is generated by determining the cross-products of only the input vectors which would yield non-zero output vectors and by applying the weighting factors to the cross-products. In an exemplary preferred embodiment, the output video data frame is generated employing the convolution function.

In summary, one aspect of the present inventions replaces pixel-wise multiplication in the spatial-domain with a convolution function in the DCT domain which exploits the orthogonality in the convolution function along with the data sparseness present in the DCT domain. A convolution operation based upon these principles is suitable for chroma-keying as well as other video or audio blending applications.

Those skilled in the art will appreciate that various adaptations and modifications of the just described preferred embodiment can be configured without departing from the scope and spirit of the invention. By way of example and not of limitation, one or more aspects of the method and apparatus of the present inventions can be modified for other applications such as pixel multiplication, feature extraction and template matching image analysis processes. Principles of the present inventions can also be applied to three-dimensional (3-D) processing. Also, the principles of the present inventions are applicable to any orthogonal transform, and are not limited to DCT transforms. Therefore, it is to be understood that, within the scope of the appended claims, the invention may be practiced other than as specifically described herein.

What is claimed is:

1. A method for receiving and processing digitized video data in a transform domain, the method comprising the steps of:

providing a plurality of input video data frames in a transform domain;

identifying input vectors associated with the input video data frames, the input vectors all being in the transform domain;

using an orthogonal characteristic of a convolution function to determine which cross-products of the input vectors yield non-zero output vectors in the transform domain and determining weighting factors for the cross-products; and generating an output video data frame by determining the cross-products of only the input vectors which yield non-zero output vectors in the transform domain and by applying the weighting factors to the cross-products.

2. The method of claim 1 wherein the transform domain is associated with an orthogonal transform.

3. The method of claim 1 wherein the input video data frames comprise blocks that do not depend upon data from other frames.

4. The method of claim 1 wherein the input video data frames comprise blocks that correspond to spatial domain blocks in only a current picture.

5. The method of claim 1 wherein the input vectors are discrete cosine transform (DCT) vectors.

6. The method of claim 1 wherein at least one of the input vectors is associated with an alpha channel.

7. The method of claim 1 wherein the output video data frame represents a chroma-keying operation associated with the input video data frames.

8. The method of claim 1 wherein the output video data frame represents an alpha blending operation associated with the input video data frames.

9. The method of claim 1 wherein the step of generating an output video data frame includes a discrete cosine transform (DCT) convolution.

10. The method of claim 1 wherein the step of generating an output video data frame includes a plurality of discrete cosine transform (DCT) convolutions.

11. A method for receiving and processing digitized video data in a transform domain, the method comprising the steps of:

providing a plurality of compressed input video data frames;

identifying input vectors associated with the input video data frames, the input vectors all being in a transform domain;

calculating a cross product of at least two of the input vectors;

using an orthogonal characteristic of a convolution function to determine which cross-products of the input vectors yield non-zero output vectors in the transform domain and determining weighting factors for the cross-products; and generating an output video data frame.

12. A method for receiving and processing digitized video data in a transform domain, the method comprising the steps of:

providing a plurality of input video data frames in a transform domain;

identifying input vectors associated with the input video data frames, the input vectors all being in the transform domain;

using an orthogonal characteristic of a convolution function to determine which cross-products of the input vectors yield non-zero output vectors in the transform domain; and generating an output video data frame.

13. The method of claim 12 further comprising the step of determining weighting factors for the cross-products.

14. The method of claim 13 further comprising the step of applying the same weighting factor to two cross products.

15. The method of claim 13 further comprising the step of obtaining a value of a weighting factor from a table of weighting factors.

16. The method of claim 15 wherein the table is at least a two-dimensional table having at least some of the weighting factors arranged in the table symmetrically about a line.

17. The method of claim 12 wherein the step of generating an output video data frame includes the step of determining the cross-products of only the input vectors which yield non-zero output vectors in the transform domain and by applying the weighting factors to the cross-products.

18. An apparatus, comprising:

means for receiving a plurality of input video data frames;

means for identifying input vectors associated with a transform representation of the input video data frames; and means for determining which cross-products of the input vectors yield non-zero output vectors and for determining weighting factors for the cross-products using an orthogonal property associated with a convolution operation.

19. The apparatus of claim 18 wherein the convolution operation is used to generate the output data frame.

20. The apparatus of claim 18 wherein the convolution operation comprises performing cross-product multiplication on two discrete cosine transform (DCT) data.

21. An apparatus operative to receive, process and output digitized data frames, comprising:

machine readable media; and instructions stored on the machine readable media that instruct a machine to receive a plurality of static input data frames associated with an orthogonal transform, identify input vectors associated with the static input data frames, determine contributions of cross-products of the input vectors to output vectors and determine weighting factors for the cross-products using an orthogonal characteristic of a convolution operation, and generate an output data frame associated with the cross-products and weighting factors.

* * * * *